July 14, 1925.
F. S. HADLEY
APPARATUS FOR COOKING
Filed Oct. 13, 1921
1,546,127
2 Sheets-Sheet 1
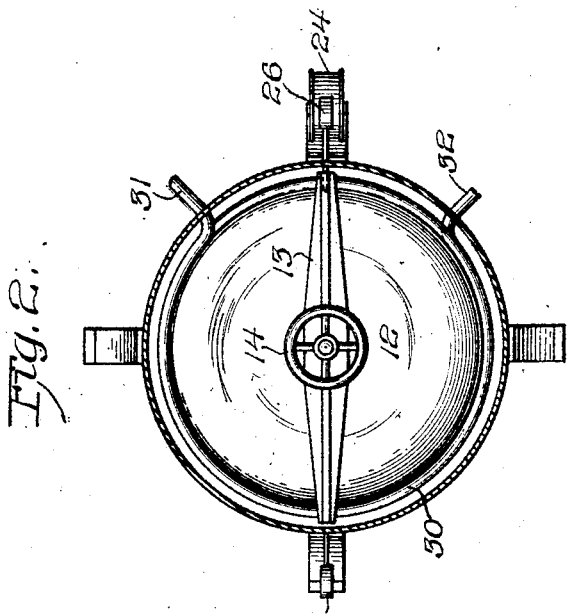
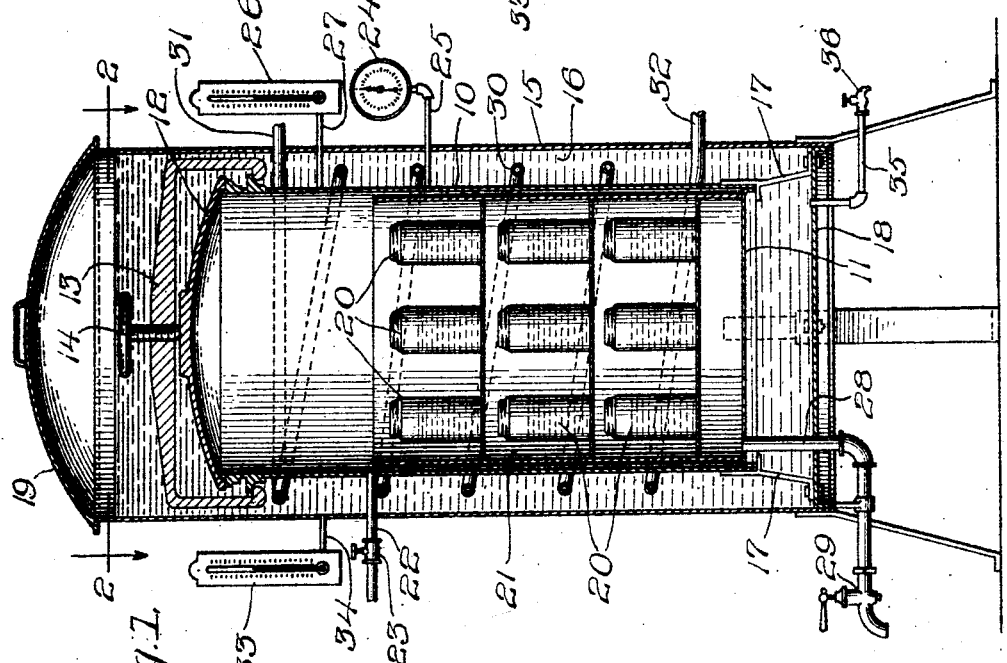
Inventor:
Frederick S. Hadley.
by
Attys.

July 14, 1925. 1,546,127
F. S. HADLEY
APPARATUS FOR COOKING
Filed Oct. 13, 1921   2 Sheets-Sheet 2
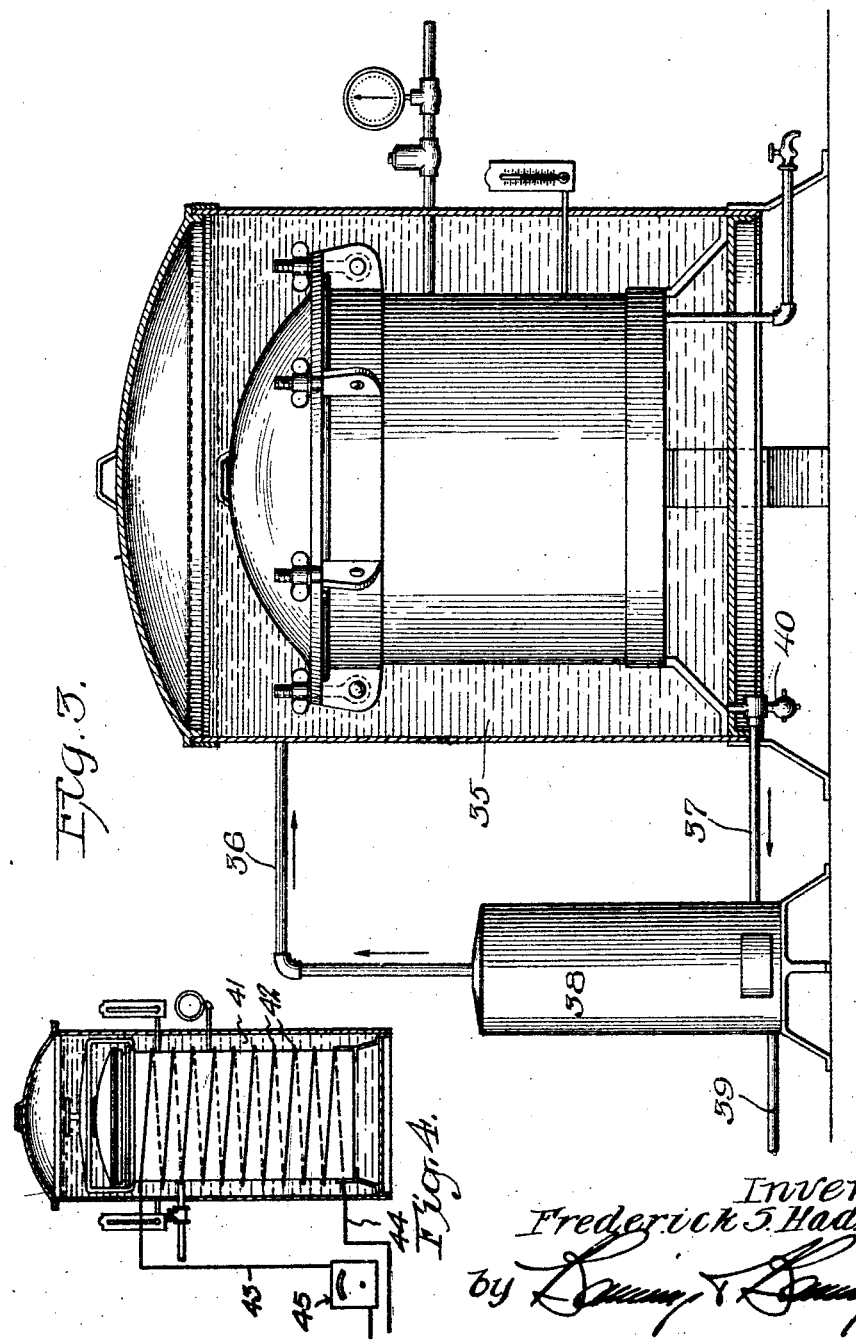

Patented July 14, 1925.

1,546,127

UNITED STATES PATENT OFFICE.

FREDERICK S. HADLEY, OF MILWAUKEE, WISCONSIN.

APPARATUS FOR COOKING.

Application filed October 13, 1921. Serial No. 507,456.

*To all whom it may concern:*

Be it known that I, FREDERICK S. HADLEY, a citizen of the United States, residing at Milwaukee, in the county of Milwaukee and State of Wisconsin, have invented certain new and useful Improvements in Apparatus for Cooking, of which the following is a specification.

This invention relates to improvements in heaters and is more particularly directed to that class of devices known as fireless cookers.

My invention has for its object the provision of a heater of the class described in which the cooking of the food is accomplished by the heat given off a body of hot water.

A further object of my invention is to provide a cooker of the class described in which the heating is accomplished by hot water, the latter surrounding the food.

With these and objects in view, the invention consists in certain novel features which are illustrated in the accompanying drawings and will hereinafter be fully described and then more particularly pointed out in the appended claim.

Figure 1 shows a vertical section through a cooker adapted for the practice of the present invention, and which cooker is provided with a water jacket which can be heated by a heating coil containing steam, hot water, or other suitable medium;

Fig. 2 shows a horizontal section taken on the line 2—2 of Figure 1, looking in the direction of the arrows;

Fig. 3 shows a view similar to that of Figure 1, Fig. 3 showing a modified form in which the water jacket is heated by water circulated from a special heater;

Fig. 4 shows diagrammatically a cooker provided with a water jacket, which water jacket may be heated by means of an electric coil whose terminals are supplied with current under the control of a suitable regulator, such as a rheostat.

Considering first the arrangement shown in Figures 1 and 2, the same includes a vessel 10 having the bottom 11 and the removable cover 12. This vessel is of air tight construction and of such strength and arrangement that it can readily and safely withstand operating pressures up to sixty or even one hundred pounds per square inch. The removable cover 12 is shown as normally held in place by means of a bridge 13 which carries a clamping screw 14 of ordinary construction.

The vessel 10 is adapted to be set down into a shell 15 of larger size, so as to establish a jacket space 16 all around the vessel 10 and below the bottom and above the top of said vessel. The cooking vessel 10 stands on a pedestal including the legs 17 by which it is supported above the bottom 18 of the shell 15. A suitable cover 19 is ordinarily used to close over the top of the shell 15 so as to prevent access of air currents to the interior of said shell.

The articles to be cooked are placed within the vessel 10. Said articles may be placed either directly within the vessel or on open shelves or trays, or the articles to be cooked may themselves be placed in individual vessels, which are in turn set into the cooking vessel 10. This is the particular arrangement illustrated in Figs. 1 and 2 of the drawings. The various articles to be cooked are placed in water in the individual vessels 20, and said individual vessels with their contents are then set upon a rack 21, which rack is seated within the cooking vessel 10.

When the various articles to be cooked are placed in individual vessels, and if cooking in a water medium the articles are covered or surrounded with water, as illustrated in Fig. 1, each of these individual vessels may itself be closed; but ordinarily these individual vessels will be left open so that the atmosphere within the cooking vessel 10 may have direct access to the contents of each individual vessel 20. In this way all of the articles being cooked will be directly subjected to the atmospheric conditions existing within the cooking vessel 10, including the pressure and humidity thereof. Consequently, all portions of the various articles being cooked will be directly subjected to the influence of a water medium.

The cooking vessel 10 is provided with a connection 22 by means of which air may be forced into it under pressure from an outside source, whereupon a valve 23 may be closed so as to maintain such pressure. A pressure gauge 24 is in communication with the vessel 10 by means of a pipe 25, and indicates to the attendant at all times the working pressure existing within the vessel 10. A thermometer 26 is also connected to the interior of the vessel 10 by a connection 27, and indicates at all times the working temperature within said vessel.

Ordinarily a small amount of water will be placed in the bottom of the vessel 10 before the cooking operation commences, said water supplying the humidity within the chamber 10. In some cases it will not be necessary to supply a special source of water for such humidity, inasmuch as the articles being cooked are covered or surrounded with water therefor.

I have illustrated a bottom connection 28 leading from the bottom 11 of the vessel 10, and provided with a cock or faucet 29 capable of withstanding a relatively high pressure existing within the vessel. The bottom connection and cock may be used for draining any liquid contents found on the floor of the vessel, as, for example, any water specially introduced, or liquid articles being cooked directly in the vessel, such as soups, and the like.

The vessel 10 may be heated in any suitable manner to give an even heating and one closely under the control of the operator. In order to avoid any rapid or relatively severe fluctuations of temperatures, I prefer to fill said jacket space with water and to heat the vessel 10 through the medium thereof. I have therefore shown the jacket space as filled with water entirely surrounding the vessel 10, as well as its top and bottom, and have also illustrated a heating coil 30 extending in helical fashion longitudinally through the jacket space 16. The upper and lower ends 31 and 32 of said coil are brought to the outside, so that steam, and so forth, superheated or saturated and of the desired temperature, or hot water of the desired temperature, or other heating medium, may be circulated therethrough. I have also illustrated a thermometer 33 as being connected into the jacket space by a connection 34, so as to indicate the temperature of the water within said space. A bottom connection 35, provided with a cock 36, is also illustrated for the purpose of draining the water or other medium from the jacket.

Manifestly, in those cases in which a jacket is provided for water or other medium, said medium may be heated either by means of a coil as shown in Figs. 1 and 2, or by direct circulation from an outside heating device as shown in Fig. 3. In this case the jacket space 35 is connected by top and bottom pipes 36 and 37 with a heater 38 having a gas burner supplied with gas through the pipe 39. A natural circulation of the heating medium will take place in the direction indicated by the arrows in Fig. 3. A cock 40 is shown connected into the pipe 37 in order to be able to drain the jacket space.

In the modified arrangement shown diagrammatically in Fig. 4, the jacket space 41 is heated by an electric coil 42 within such space, the terminals 43 and 44 of such coil receiving current under control of a rheostat 45.

It will be observed that in each one of the arrangements shown in Figs. 3 and 4, provision is made for subjecting the interior of the vessel to a suitable pressure in manner similar to the arrangement shown in Figs. 1 and 2.

I claim:

An apparatus for cooking foods or the like comprising in combination a closed air tight cooking vessel capable of withstanding relatively heavy integral pressure, a water jacket enclosing said vessel on all of its sides, top and bottom, a connection for introducing air under pressure into the vessel and for maintaining the same therein, means for indicating the temperature and pressure of air within the vessel, a heating coil positioned about the vessel and extending from its top to bottom and within said water jacket for heating the same to a desired temperature, means for indicating the temperature of the water jacket, and a series of food containers within said vessel.

FREDERICK S. HADLEY.